United States Patent [19]

Vincent

[11] Patent Number: 5,706,989
[45] Date of Patent: Jan. 13, 1998

[54] CONTAINER WITH IMPROVED ACTIVATABLE MOUNTING ASSEMBLY

[76] Inventor: Robert C. Vincent, 104 Rose Twig La., North Wales, Pa. 19454

[21] Appl. No.: 764,771

[22] Filed: Dec. 12, 1996

Related U.S. Application Data

[63] Continuation of Ser. No. 392,309, Feb. 22, 1995, abandoned, which is a continuation-in-part of Ser. No. 210,192, Feb. 24, 1994, Pat. No. 5,556,015.

[51] Int. Cl.⁶ ............................................. B60R 9/055
[52] U.S. Cl. ............................................. 224/328; 224/309
[58] Field of Search .................... 16/18 CG; 74/553; 224/309, 310, 321, 328, 314, 484; 248/188.2, 188.4, 188.8; 190/18 A

[56] References Cited

U.S. PATENT DOCUMENTS

| 2,440,821 | 5/1948 | Godwin | 224/328 |
| 4,735,394 | 4/1988 | Facco | 248/188.8 |
| 4,907,770 | 3/1990 | Marchetti | 248/188.8 |
| 4,915,402 | 4/1990 | Brinker | 190/18 A |

FOREIGN PATENT DOCUMENTS

| 2703719 | 8/1978 | Germany | 224/328 |
| WO8704982 | 8/1987 | WIPO | 224/309 |

*Primary Examiner*—David Scherbel
*Assistant Examiner*—Terrence Till
*Attorney, Agent, or Firm*—Duane, Morris & Heckscher, LLP

[57] ABSTRACT

Disclosed is a generally elongated container of stiff, durable material, preferably hard molded plastic, adapted to store within the interior thereof relatively large and bulky personal items such as skis, snowboards, bicycles, golf clubs and the like. Located on one surface of the container are a multiplicity of spaced mounting assemblies each of which is manually activatable between a first inactive condition where it is recessed into the wall of the container, and an active condition where the mounting assembly is extended along an axis orthogonal to the sidewall of the container.

18 Claims, 6 Drawing Sheets

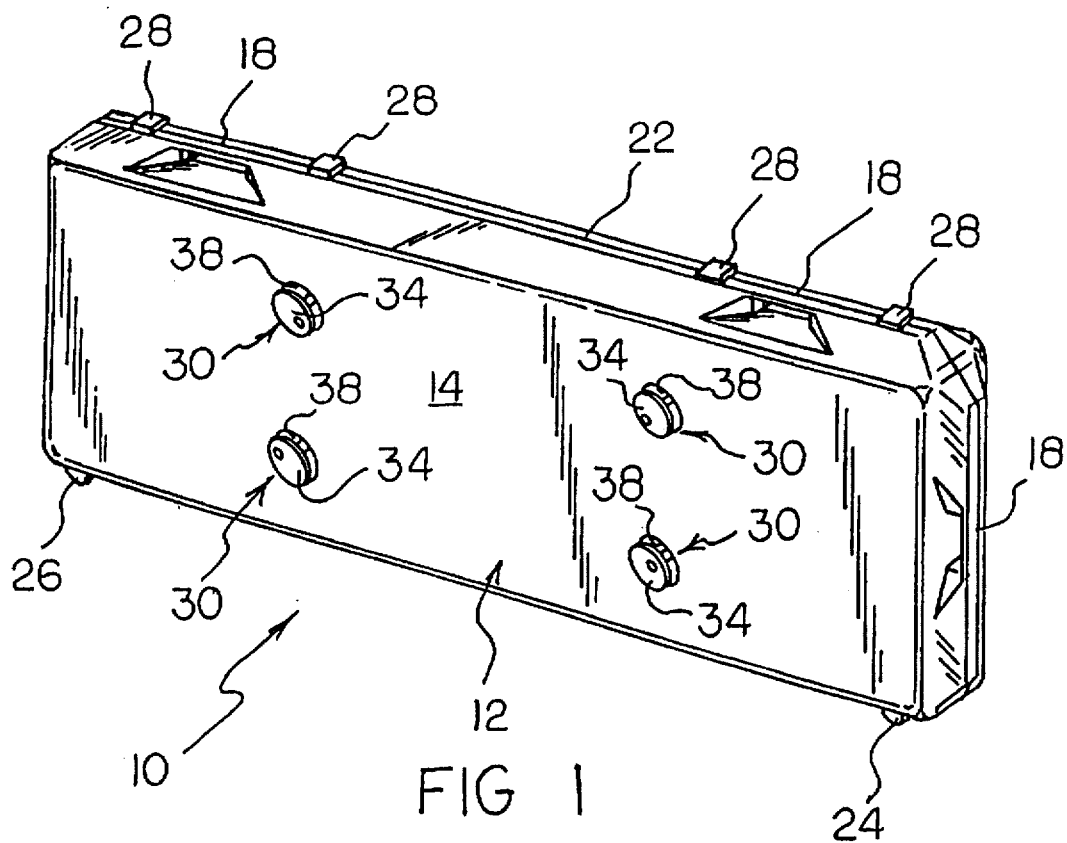
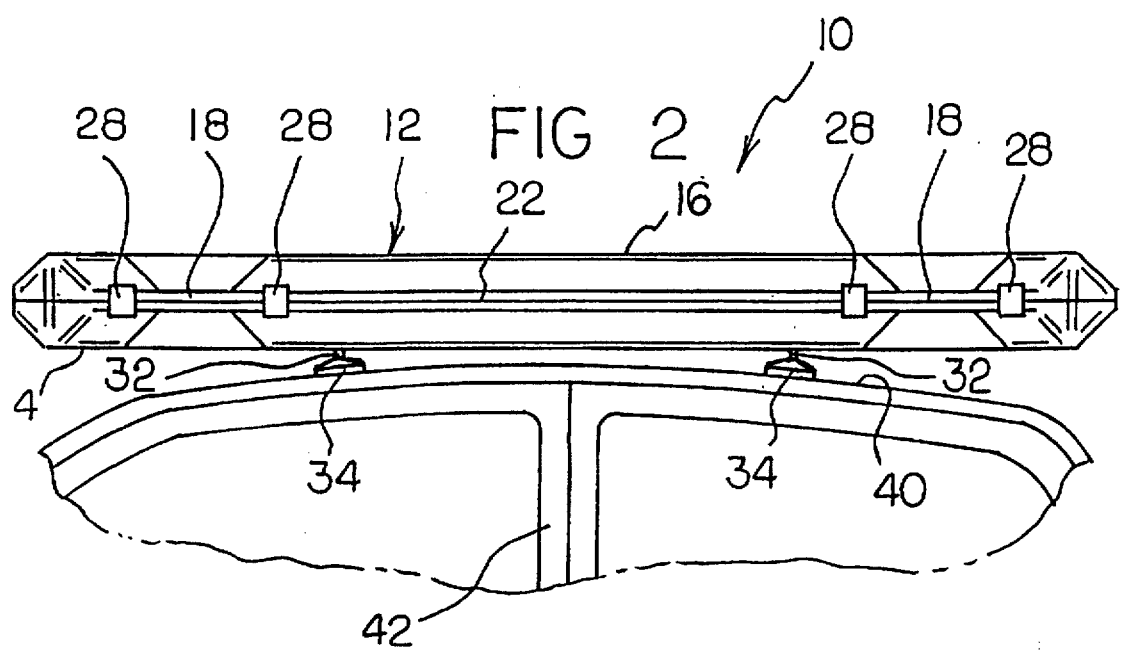

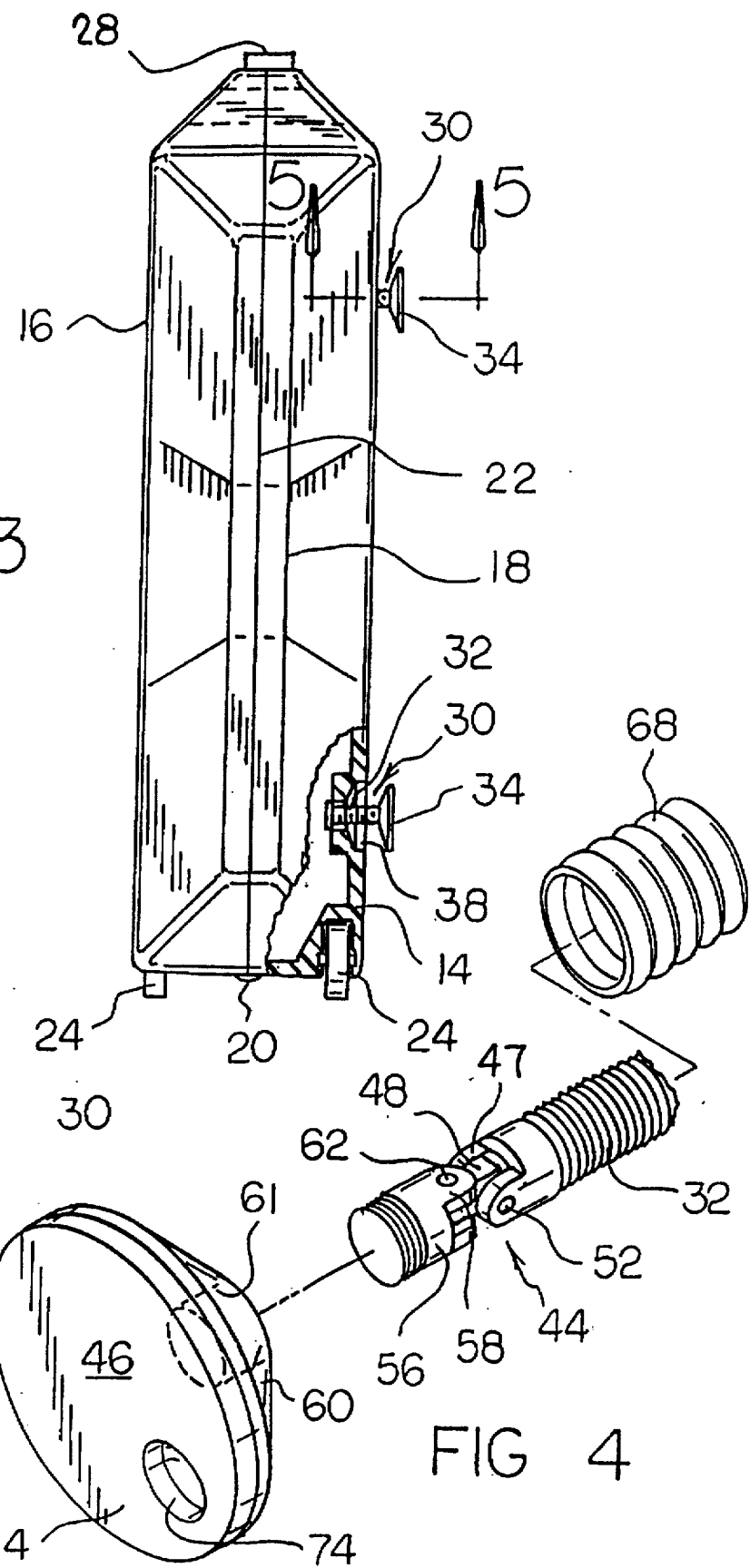

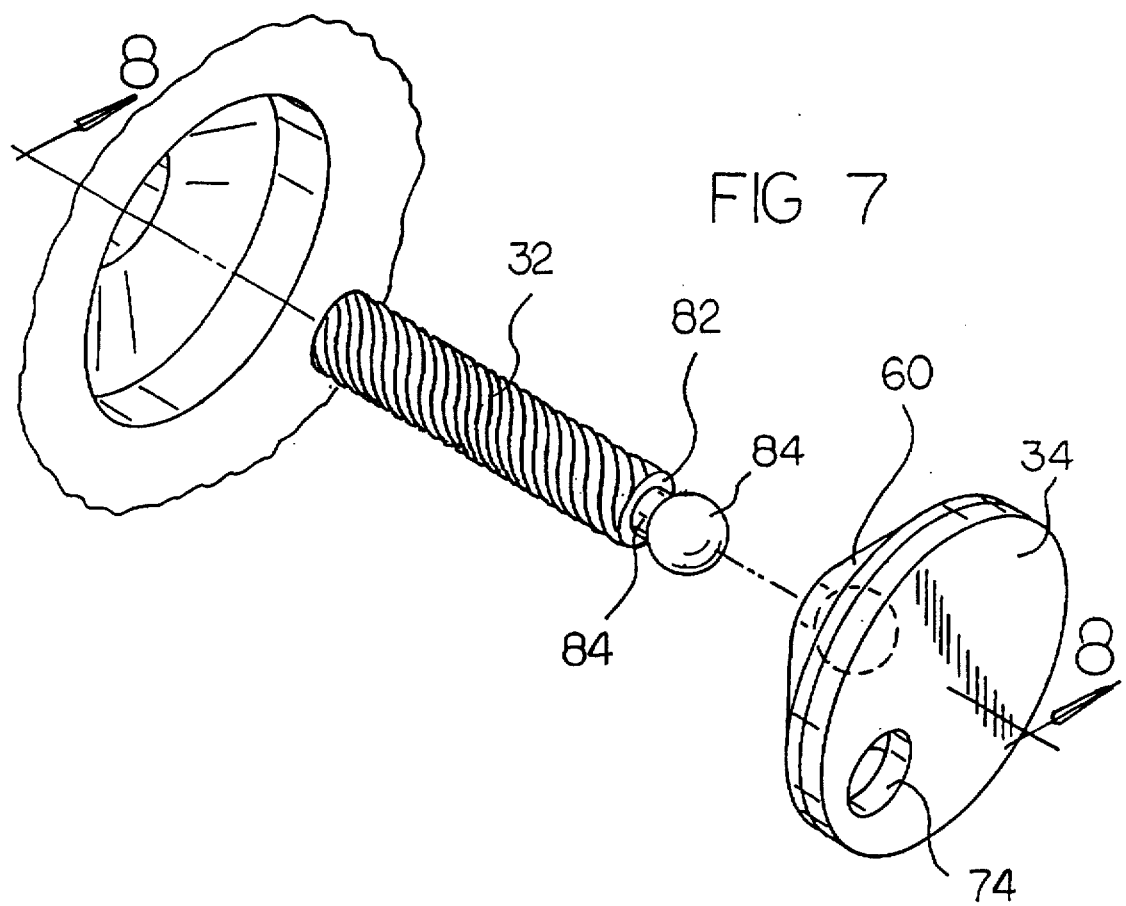
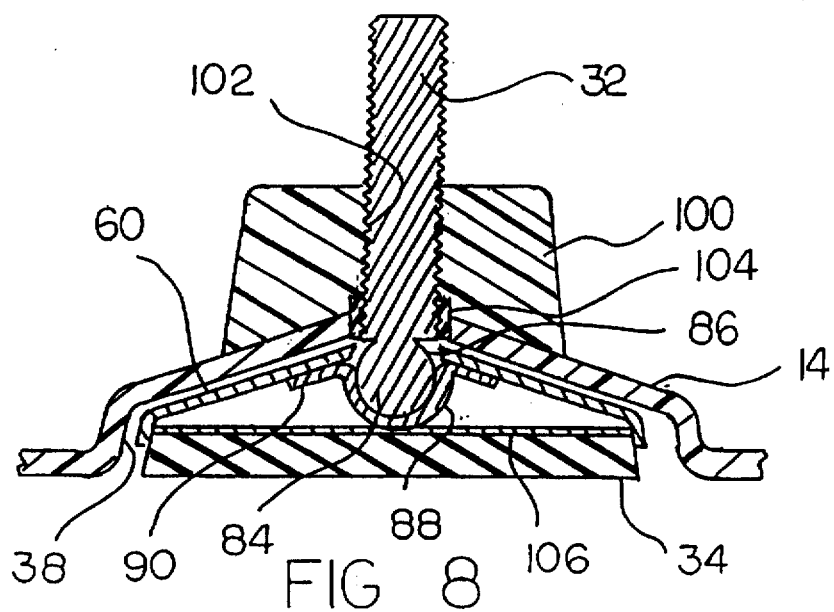

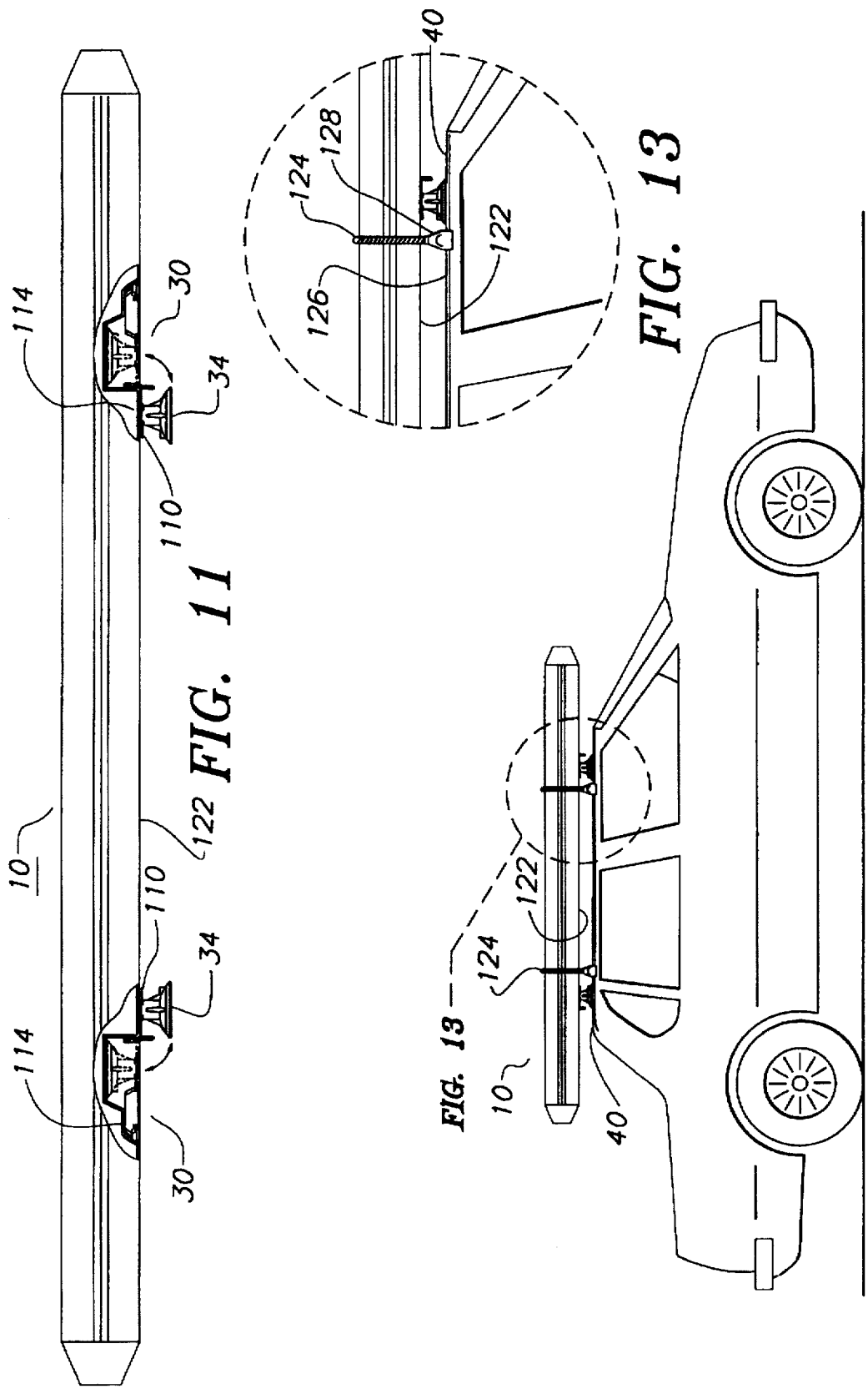

CONTAINER WITH IMPROVED ACTIVATABLE MOUNTING ASSEMBLY

RELATED APPLICATIONS

This is a continuation, of application Ser. No. 08/392,309, filed Feb. 22, 1995, now abandoned, which is a continuation-in-part of U.S. patent application Ser. No. 08/210,192, entitled CONTAINER WITH ACTIVATABLE MOUNTING ASSEMBLY, filed on Feb. 24, 1994 now U.S. Pat. No. 5,556,015.

FIELD OF THE INVENTION

The present invention relates generally to containers, and more particularly, to a container having self-contained means for facilitating the mounting of the container on a surface such as, for example, the roof of a vehicle.

BACKGROUND OF THE INVENTION

Roof racks securely mounted to the roof of a vehicle are commonly used to facilitate the transportation of large and bulky personal items such as luggage, skis, bicycles and the like. A longstanding need exists for a container which may be used to store relatively large and bulky personal items such as the aforementioned skis, bicycles and the like, and which container may be sent via a first mode of transportation (e.g. a truck, train, boat or airplane) to a first destination and then mounted on the roof of a vehicle comprising a second mode of transportation (e.g. a rented automobile, taxi, and bus) for travel to a second subsequent destination even though the roof of the vehicle does not have mounted thereon a conventional roof rack or similar container securement apparatus.

This need is satisfied by the present invention which broadly speaking contemplates a container for storing large and bulky personal items and which container includes a self-contained apparatus for facilitating the mounting of the container on the roof top of a vehicle lacking a conventional roof rack or other baggage securement device. Additional advantages of the present invention over the prior art also will be rendered evident by the following description thereof.

SUMMARY OF THE INVENTION

The aforementioned needs are met by mounting assemblies for a container provided in accordance with the present invention. The mounting assemblies preferably comprise first means for supporting the container on an irregular surface, and second, for activating the first means from a closed position to an open position so that the first means rests on an irregular surface. Methods of transporting items are also provided in accordance with the present invention. Even more preferably, the methods comprise storing the items in a container which is universally mounted to the surface of the vehicle, and opening an activatable mounting assembly stored in a recess on the container such that the mounting assembly rests on the surface that secures the container thereto. Still more preferably, the containers are universally mountable to vehicles with cords which interface the containers to the vehicles.

In yet further preferred embodiments, the mounting assemblies comprise a mounting pad interfaceable with a surface on the container and a hinge on the mounting pad to activate the assembly. In yet further preferred embodiments, the mounting assembly further comprises a locking button opposite the hinge, and a latch plate on the mounting pad for holding the assembly in the closed position.

The mounting assemblies, and containers described and claimed throughout, provide the advantageous result of allowing bulky items such as skis, skates, and other sporting equipment to be transportable in a container conveniently. This container can be universally interfaced to any vehicle, and particularly to cars have irregular roof surfaces. Such results have not heretofore been achieved in the art.

The invention will be best understood by reading the following detailed description of preferred embodiments in conjunction with the drawings which are first described briefly below.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 1 is a perspective view showing the container with activatable mounting assembly according to the present invention.

FIG. 2 is an elevational view of the container with activatable mounting assembly of FIG. 1 schematically showing the preferred mounting position thereof on the roof of a vehicle.

FIG. 3 is an elevational end view partly in cross-section of the container with activatable mounting assembly of FIGS. 1 and 2.

FIG. 4 is an exploded assembly in perspective of a first preferred embodiment of the mounting assembly used in connection with the present invention.

FIG. 7 is an exploded assembly in perspective of a second alternatively preferred embodiment of the mounting assembly used in connection with the present invention.

FIG. 8 is a cross-sectional elevational view taken along line 8—8 of FIG. 7.

FIG. 11 is an elevational view of a container utilizing the third embodiment of the activatable mounting assembly provided in accordance with the present invention.

FIG. 12 is a view of a container in accordance with the present invention mounted to the roof of a car utilizing cords to secure the container to the roof of the car.

FIG. 13 is blown-up view of a container utilizing the third embodiment of the activatable mounting assembly provided in accordance with the present invention.

DETAILED DESCRIPTION OF PREFERRED EMBODIMENTS

Figure 5:
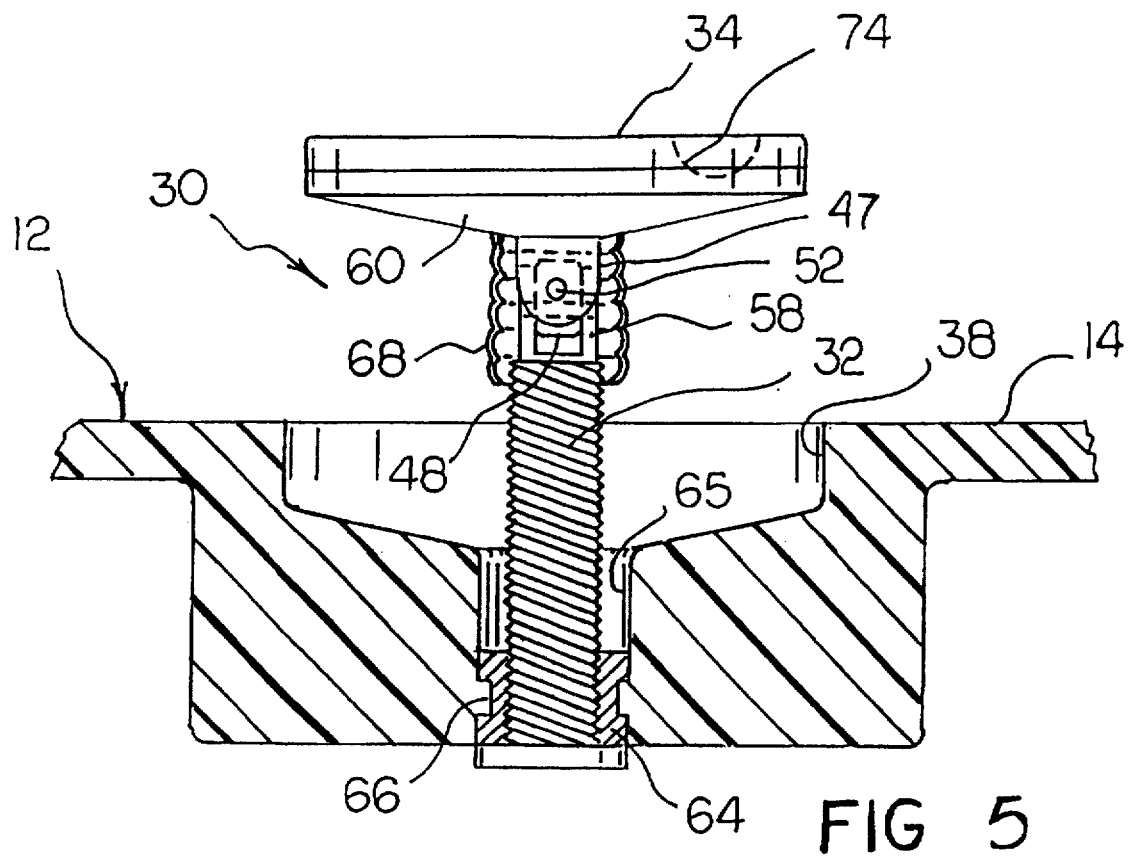
FIG. 5 is a cross-sectional enlarged view taken along line 5—5 of FIG. 3 and showing a mounting assembly of the container of the present invention in the extended activated condition.

With reference now to the drawings, a new and improved container with activatable mounting assembly embodying the principles and concepts of the present invention will be described.

Turning initially to FIGS. 1–6, there is shown a first preferred embodiment of the container with activatable mounting assembly according to the present invention generally designated by reference numeral 10. Container 10 generally comprises an elongated, rectangularly shaped housing or outer shell 13 having opposed substantially flat sides 14, 16 and a series of molded-in-place carrying handles 18 spaced around three sides of the housing. The fourth side has a central hinge 20 permitting the two halves of the housing to open and close relative to each other in the manner of a conventional suitcase or similar piece of luggage. A central seam 22 thus extends peripherally about the three non-hinged sides of the housing. Separate pairs of wheel assemblies 24, 26 are suitably affixed at opposite ends of the fourth or hinged side substantially as shown to enable the housing to easily be pulled along the ground with a tether (not shown). A multiplicity of conventional lockable latch assemblies 28 preferably are provided spaced along the top side of the housing substantially as shown to selectively allow the housing halves to be opened and then locked closed in a manner believed apparent without further discussion inasmuch as the details of the lockable latches 28 are outside the scope of the present invention.

In its preferred form, housing or outer shell 12 is fabricated of a stiff, strong, hard, durable, molded plastic material so as to provide a hard protective shell that is light in weight, yet suitable for protecting and concealing costly personal items of a relatively large or bulky nature such as, by way of example only, and without limiting the present invention, skis, ski poles, snowboards, bicycles, golf clubs and the like, when it is desired to transport such items relatively long distances as by airplane bus, boat truck or train, and it is further desired to efficiently safeguard the articles against damage theft or other loss during the baggage handling process commonly encountered when such articles are so transported. An especially suitable material is high density polyethylene which may be either vacuum formed or injection molded to form housing 12 in a manner well known and understood in the plastics forming art. An ultra-high molecular-weight polyethylene yields a formed article having excellent tensile strength and resistance to deformation under wide temperature cycling and therefore is particularly preferred.

In this regard, the interior of the housing 12 may be fitted with a suitable cushioning material (not shown) of a flexible character such as foam rubber or the like having cut-outs or receptacles in the shape of a particular article(s) (e.g. a pair of skis and a pair of ski poles) in order to firmly position the articles inside the housing and maintain the articles in a relatively fixed position therein.

In accordance with the present invention, a multiplicity of separate, selectively and independently activatable mounting assemblies 30 are provided in at least one side of the housing 12, namely side 14, with the preferred arrangement comprising four (4) such assemblies spaced apart to form a rectangular arrangement substantially as depicted in FIG. 1. Each mounting assembly 30, in turn, comprises an extensible support rod or shank 32 the distal end of which terminates in a disc shaped foot pad 34 of relatively soft, flexible material such as rubber, with neoprene rubber being particularly preferred. An important feature of the present invention is the ability of the extensible mounting assembly to be activated when and as desired from an in-active position (FIG. 6) where the extensible support rod is withdrawn into the sidewall 14, and the foot pad is nested in a recess 38 of complimentary shape to the foot pad such that the foot pad and the mounting assembly are rendered substantially flush with respect to the outside wall surface of the housing, to an active position (FIG. 1 through 3 and 5) where the rod 32 is extended and the foot pad 34 is adapted to engage the surface 40 of a vehicle 42 as shown to best advantage in FIG. 2.

Figure 6:
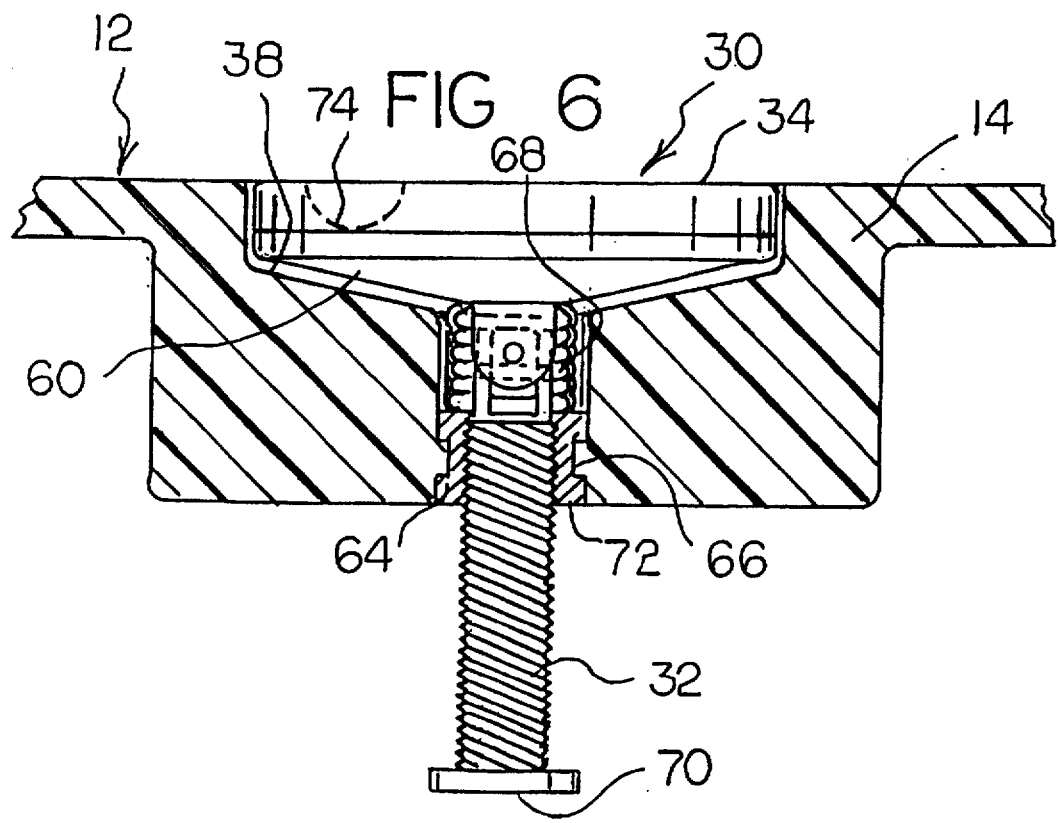
FIG. 6 is a cross-sectional enlarged view taken along line 5—5 of FIG. 3 and showing a mounting assembly of the container of the present invention in the recessed non-activated condition.

Turning now to FIGS. 4 through 6, the details of the mounting assembly are shown. In a first preferred embodiment, rod 32 is joined to foot pad 34 via a universal joint or connection generally indicated by reference numeral 44 which connection permits the footpad to swivel or pivot at any angle relative to the fixed central axis of rod 32. By this arrangement, the foot pad bottom surface 46 will be caused to firmly and securely engage the convex surface 40 of vehicle 42 while maintaining housing 12 in a substantially horizontal position on the vehicle roof top as substantially shown in FIG. 2 (i.e. parallel to the vehicle's longitudinal axis).

More specifically, rod 32 terminates in a first bifurcation 47 which engages one end of a quadrature link 48 by means of a first transverse pin 52 suitably attached to bifurcation 47 through a pair of holes therein and passing through a first hole in quadrature link 48. Similarly, a rod extension 56 is suitably fixed to foot pad conical support shell 60 by means of a threaded central recess 61 and complimentary male fastener threads on the distal extremity of rod extension 56. The opposed end of rod extension 56 terminates in a second bifurcation 58 which engages the other end of quadrature link 48 by means of a second transverse pin 62 suitably attached to the second bifurcation through a pair of holes therein and passing through a second hole in quadrature link 48 with the second hole in the quadrature link having its axis rotated ninety degrees with respect to the axis of the aforementioned first hole in the quadrature link.

It will thus be appreciated that by this universal joint construction, the axis of rod extension (and the plane of foot pad bottom surface 46) may be caused to assume a wide range of different angular attitudes relative to the axis of rod 32 at any angular or rotational position of the foot pad relative to the fixed central defined by support rod 32.

Extensible rod 32 has a male threaded shank and is matingly engaged with a complimentary female bushing or nut 64 preferably molded in place and fixed to the surrounding plastic material of wall 14 at the bottom end of orthogonal recess or opening 65 passing through wall 14 substantially as depicted in FIGS. 5 and 6. The exterior of bushing 64 preferably has a circumferential groove 66 to enhance its purchase on the surrounding plastic material. The upper end of recess 65 is circumferentially enlarged with respect to the threaded periphery of the shank of rod 32 to provide space for accommodating a flexible, rubber protective sleeve or boot 68 circumferentially and co-axially disposed about universal joint 44 and affixed in a suitable manner to conical support shell 60 as by the use of an adhesive. Thus, when the rod is rotated relative to bushing 64 and thereby caused to retract to the position shown in FIG. 6, the sleeve 68 is axially compressed into recess 65 and forms a seal therein against moisture, dirt, and so on. An end cap 70 is suitably affixed to the top of rod 32 and provides a stop member adapted to engage the bottom annular surface 72 of bushing 64 when the rod is rotated to extend upwardly as shown in FIG. 5 thereby limiting the extensible movement of the rod and the foot pad and preventing complete unscrewing of the rod relative to the bushing. To facilitate easy rotation of the foot pad and the rod relative to the bushing, a finger depression 74 radially offset with respect to the central axis of the foot pad is suitably provided in the bottom surface 46 of the foot pad substantially as shown. Foot pad 34 may be attached to its conical supporting shell 60 in any convenient manner with securement by a suitable adhesive being mostly preferred.

Turning now to FIGS. 7 and 8 there is shown an alternatively preferred embodiment of the invention wherein similar reference numerals represent like parts already described. In the alternatively preferred embodiment of FIGS. 7 and 8, the universal joint connecting the extensible rod 32 and the foot pad is replaced by a less complicated, lower cost version featuring a ball and socket connection. Thus, extensible support rod 32 terminates at its distal end 82 in a post 84 supporting a ball 84 which latter extends through a central opening 86 in conical shell 60 to engage a socket 88 having an integral radially extending rim 90 which, in turn, is affixed to the underside of conical shell 60 substantially as shown. Rim 90 may be attached to the conical shell by rivets, welding or a suitable adhesive. The socket 88 is preferably of spring metal and frictionally engages the ball 84 sufficiently to transfer torque from the foot pad 34 to the rod 32. Hence, it will be appreciated that rotation of the foot pad about the central axis defined by rod 32 will cause extension or retraction of the rod relative to support block 100 which is fabricated of the same plastic material as wall 14 and is either bonded to the wall via a suitable adhesive or is molded integral with the wall as desired. The central recess 102 in the block 100 has a female threaded surface complementary to the male threads on rod 32. A sealing bushing 104 of elastomeric material may be seated at the bottom of central recess 102 substantially as shown. The foot pad 34 may be affixed to support plate 106 which is press fitted into the conical shell 60.

The entire assembly comprising extensible rod 32, ball 84, socket 88, conical shell 60 and foot pad 34 easily may be replaced if broken or worn by merely unscrewing rod 32 from recess 102 and rotatably threadedly engaging the extensible rod of a new assembly into recess 102. The operation of the alternative embodiment of FIGS. 7 and 8 is in all other respects identical to that of the embodiment of FIGS. 1 through 6.

Figure 9:
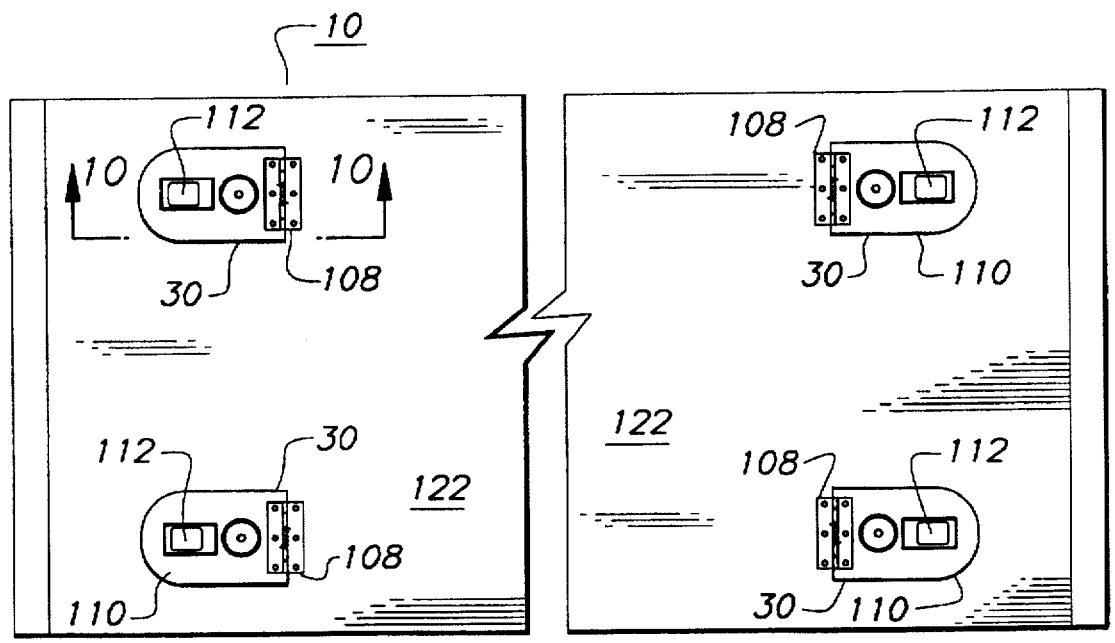
FIG. 9 is a broken, plan view of a container provided in accordance with the present invention having a third embodiment of the activatable mounting assembly.

A third preferred embodiment of mounting assemblies 30 are illustrated in FIGS. 9 through 13. Referring specifically to FIG. 9, the third embodiment preferably comprises a hinge shown at 108 integrally attached to the body of the container 10. The hinge may be secured by screws, tacks, or any other device which provides sufficient sturdiness to the hinge and assembly 30 and which securely holds the hinge to the container 10. Even more preferably, the device comprises a mounting pad 110 attached to the hinge 108 which is movably activated by a latch button 112 on a substantially opposite side of the mounting pad 110 from the hinge 108.

Figure 10:
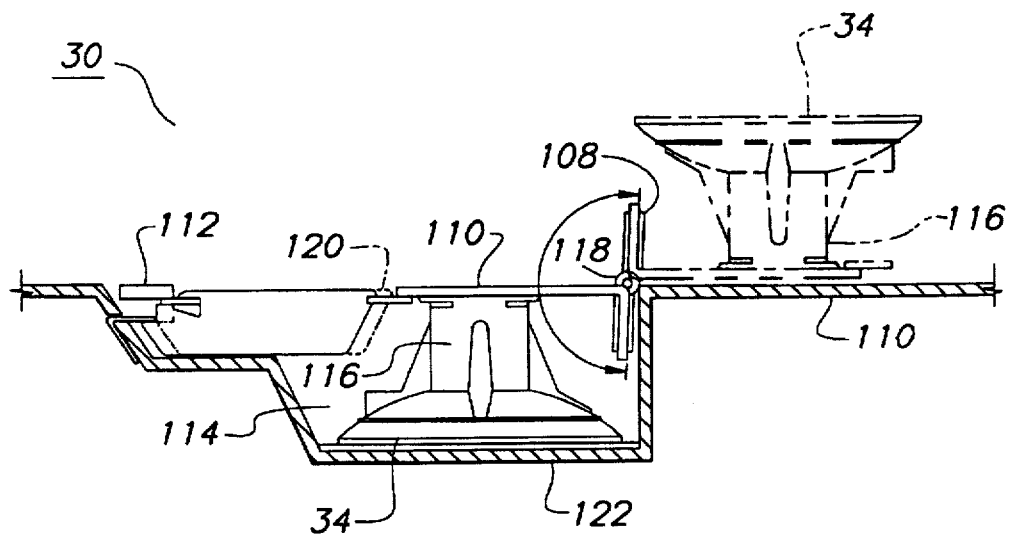
FIG. 10 is a cross-sectional, elevational view of an activatable mounting assembly taken along the 10—10 line of FIG. 9.

Referring to FIG. 10, the third preferred embodiment of the activatable mounting assembly 30 is further illustrated. When the rubber pad 34 is in the closed position, it is housed substantially in a recess 114 molded into a lower wall or undersurface 122 of the container 10. Preferably, the pad 34 is interfaced to the mounting pad 110 by an integral shaft member 116 which extends from the mounting pad 110 to the rubber pad 34 so that a unitary, caster-like member is formed which will rest upon a vehicle's hood when the container is secured thereto. Hinge 108 is activated by a spring 118 having a sufficient spring constant to rapidly open the mounting pad 110 and the caster-like assembly secured thereto. The latch button 112 disengages a latch plate 120 that holds the mounting pad 110 in the closed position before the button activates spring 118 and hinge 108.

Referring to FIG. 11, the mounting assembly 30 is shown recessed in the container 10 such that when rubber pad 34 and mounting pad 110 are in the closed position, the entire mounting assembly is substantially enclosed in the recess 114 and virtually invisible from view. When the latch button 112 is activated thereby releasing the mounting pad 110 from the latch plate 120, the assembly is popped open by the hinge 108 and spring 118 to rest securely against a surface of a vehicle, preferably the roof of a car.

FIGS. 12 and 13 illustrate the interfacing of the third embodiment of the mounting assembly provided in accordance with the present with the roof 40 of a vehicle. Preferably, the container 10 is placed on the vehicle surface 40 after the latch button 112 has released the assembly so that the neoprene rubber pad 34 and mounting pad 110 abut against the undersurface 122 of the container 10. When the container 10 and mounting assemblies are finally resting on the surface 40, it is preferable to secure the container to the car with a series of ropes or bungee cords shown generally at 124, which have tabs 128 that interface with the jambs 126 of the vehicle's door. In this fashion, when the tabs 128 are placed in the jambs 126 and the door is closed, the container 10 will be securely fastened to the car and the assemblies 30 will act in a caster-like fashion to mount the container 10 to the surface so that any desired accoutrements can be transported in the container 10 to a particular location. In this fashion, the container 10 acts as a universal roof rack which will fit virtually any vehicle of any configuration.

As mentioned above, the housing outer shell 12 of the invention is preferably made of a lightweight strong, hard, molded plastic material such as vacuum or injection molded high density polyethylene with ultra-high-molecular-weight polyethylene (UHMWPE) being particularly preferred. In addition, it is to be appreciated that other materials, such as composite materials, may be used to make the housing shell of the present invention. The other parts of the container according to the invention may also be made from durable materials such as molded plastic, or metal, or combinations thereof as will occur to those of ordinary skill.

As to the manner of usage and operation of the present invention, the same should be apparent from the above description. Accordingly, no further discussion relating to the manner of usage and operation will be provided except to note that one or more conventional transverse straps forming no part of the present invention may be utilized to help tie-down the container when it is positioned as shown in FIG. 2 with such straps having connectors at either opposed end for engagement with either the gutter rail on the roof of the vehicle or the top portion of the side window frame of the vehicle door(s).

It is apparent from the above that the present invention accomplishes all of the objectives set forth by providing a new and improved container with activatable mounting assembly that is adapted to store relatively large and bulky items and be securely mounted on the roof of a vehicle; that features a unique self-contained mounting assembly which may be recessed into the sidewall of the container when the latter is used in one mode of transportation, and which may be extended to engage the roof surface of a vehicle when the container is used in another or second mode of transportation; and that includes a multiplicity of such extensible mounting assemblies each of which has a foot pad that is adapted to be independently adjusted in a rapid and easy manner to conform to the irregular convex roof curvature of a vehicle roof top.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A mounting assembly for a container comprising:

a container having a recessed portion;

a foot pad for supporting the container on an irregular surface; and means for activating said foot pad from a closed position to an open position wherein said foot pad does not contact the irregular surface, to an open position so that said foot pad contacts the irregular surface to support said container thereon;

said means including a longitudinally elongated support member defining an axis, means for movably mounting said support member on a recessed portion of said container and for permitting selective movement of said support member along said axis between a first recessed position and a second extended position, and pivotal connection means between said footpad and said one end of said support member for permitting said foot pad to pivot relative to said support member when said member is axially moved from said first position to said second position.

2. The mounting assembly of claim 1 wherein said pivotal connection means comprises a universal joint.

3. The mounting assembly of claim 2 wherein said universal joint is a ball and socket.

4. The mounting assembly of claim 1 wherein said mounting means comprises a threaded bushing mounted in an opening located within a wall portion of said container and said support member comprises an externally threaded rod matingly engaging said bushing, and said foot pad nests within said recess when said support member is in said first position.

5. The mounting assembly of claim 4 wherein said foot pad has a bottom surface, and a depression in said bottom surface such that selective manual engagement of said foot pad via said depression in said bottom surface thereof is effective to cause rotation of said foot pad and movement of said support member from said first position to said second position.

6. The mounting assembly of claim 4 wherein said opening defines an annular space surrounding said externally threaded rod in at least a portion of said opening, said at least portion of said opening communicating with said recess, said rod having a flexible sleeve thereon, and said sleeve being axially received within said annular recess when said rod is moved to said flat position.

7. The combination defined in claim 6 wherein said irregular surface is the roof of a vehicle, said roof having a convex shape, and said at least one substantially flat wall of said container is adapted to be mounted parallel to the longitudinal axis of said vehicle with said foot pad of said mounting assembly engaging said convex surface when said mounting member is moved to sid second position.

8. The combination of claim 7 wherein a multiplicity of said mounting assemblies are disposed in said at least one substantially flat wall.

9. The combination of claim 8 wherein said multiplicity comprises four in number and said multiplicity forms a rectangular pattern.

10. The mounting assembly of claim 4 wherein said foot pad is disc shaped and extends radially with respect to said rod, said recess being shaped to accommodate said foot pad therein when said rod is moved to said first position.

11. The combination of the mounting assembly of claim 1 wherein said container is elongated and rectangular in shape and has at least one substantially flat wall, said mounting assembly being mounted in a recess in said at least one substantially flat wall.

12. A mounting assembly for a container comprising:

a container having a surface;

first means for supporting said container on an irregular surface;

second means for activating said first means from a closed position wherein said first means does not contact said irregular surface, to an open position so that said first means contacts said irregular surface to support said container thereon;

said first means including a mounting pad being interfaceable with said surface of said container, and said second means including a hinge on said mounting pad to activate the assembly.

13. The mounting assembly of claim 12 further comprising a locking button opposite the hinge, and a latch plate on the mounting pad for holding the assembly in the closed position.

14. A container for holding and transporting items, said container being universally mountable to any vehicle for transport comprising:

a recessed cavity for housing an activatable mounting assembly; and an activatable housing assembly interfaceable in said cavity, said housing comprising first means for supporting said container on an irregular surface on the vehicle, and second means for activating said first means from a closed position wherein said first means does not contact said irregular surface to an open position so that said first means contacts said irregular surface to support said container thereon, said first means including a mounting pad being interfaceable with a surface on said container, and said second means including, a hinge on said mounting pad to activate the assembly.

15. The container of claim 14 further comprising a locking button opposite the hinge, and a latch plate on the mounting pad for holding the assembly in the closed position.

16. A method of transporting items comprising the steps of:

storing the items in a container which is universally mountable to a surface of a vehicle; and opening an activatable mounting assembly stored in a recess on the container such that the mounting assembly rests on the surface and secures the container thereto, wherein the assembly is movable from a closed position where the assembly does not rest on the surface to an open position where the assembly rests on the surface.

17. The method recited in claim 16 further comprising the step of activating a latch button on the assembly to open the assembly from the closed position.

18. The method recited in claim 17 further comprising the step of securing the container to the vehicle with a cord.

* * * * *